United States Patent
Ching et al.

(10) Patent No.: US 11,639,040 B2
(45) Date of Patent: May 2, 2023

(54) SHAPE MEMORY MANUFACTURING FOR VESSELS

(71) Applicant: GOODRICH CORPORATION, Charlotte, NC (US)

(72) Inventors: Nathaniel Ching, Hartville, OH (US); Jin Hu, Hudson, OH (US); Casey Slane, Tallmadge, OH (US)

(73) Assignee: Goodrich Corporation, Charlotte, NC (US)

( * ) Notice: Subject to any disclaimer, the term of this patent is extended or adjusted under 35 U.S.C. 154(b) by 316 days.

(21) Appl. No.: 16/796,791

(22) Filed: Feb. 20, 2020

(65) Prior Publication Data

US 2021/0046715 A1    Feb. 18, 2021

Related U.S. Application Data

(60) Provisional application No. 62/888,211, filed on Aug. 16, 2019.

(51) Int. Cl.
| | | |
|---|---|---|
| *B29D 22/00* | (2006.01) | |
| *B29C 65/00* | (2006.01) | |
| *B29C 70/34* | (2006.01) | |
| *B64D 11/00* | (2006.01) | |

(Continued)

(52) U.S. Cl.
CPC ........ *B29D 22/003* (2013.01); *B29C 66/5227* (2013.01); *B29C 66/721* (2013.01); *B29C 70/342* (2013.01); *B29C 70/72* (2013.01); *B64D 11/00* (2013.01); *B29K 2995/0096* (2013.01); *B29L 2031/3076* (2013.01)

(58) Field of Classification Search
None
See application file for complete search history.

(56) References Cited

U.S. PATENT DOCUMENTS

| | | |
|---|---|---|
| 3,615,999 A | 10/1971 | Basier et al. |
| 4,453,995 A | 6/1984 | Morrisey |
| 7,422,714 B1 | 9/2008 | Hood et al. |

(Continued)

FOREIGN PATENT DOCUMENTS

| | | |
|---|---|---|
| EP | 0503142 | 9/1992 |
| EP | 3388224 | 10/2018 |

(Continued)

OTHER PUBLICATIONS

YouTube; SMART18100,"Smart Caul Trapped Geometry Demold Process"; published Nov. 19, 2017; Retreived from Internet Feb. 25, 2020: https://www.youtube.com/watch?v=Q2LSMART 30X2mQ, *Four Video frames covering time stamps between 0.00-0.32 seconds*.

(Continued)

*Primary Examiner* — Barbara J Musser
(74) *Attorney, Agent, or Firm* — Snell & Wilmer L.L.P.

(57) ABSTRACT

A method of manufacturing a cured vessel is disclosed herein. The method comprises wrapping a first bladder in a first composite laminate, wrapping a second bladder in a second composite laminate. The method further comprises joining the first composite laminate and the second composite laminate by wrapping them both in a third composite laminate to form an un-cured vessel. The un-cured vessel is cured by heating the uncured vessel and pressurizing the bladder while the uncured vessel is in a vessel mold.

15 Claims, 10 Drawing Sheets

(51) Int. Cl.
  *B29C 70/72* (2006.01)
  *B29L 31/30* (2006.01)

(56) References Cited

U.S. PATENT DOCUMENTS

| | | |
|---|---|---|
| 8,038,923 B2 | 10/2011 | Berger et al. |
| 8,057,206 B1 | 11/2011 | McKnight |
| 8,449,810 B2 | 5/2013 | Rousseau |
| 8,951,375 B2 | 2/2015 | Havens et al. |
| 9,073,240 B2 | 7/2015 | Huelskamp et al. |
| 9,724,870 B2 | 8/2017 | Morrow |
| 9,808,997 B1 | 11/2017 | Rotter et al. |
| 9,919,505 B2 | 3/2018 | Shome et al. |
| 2008/0315466 A1 | 12/2008 | Hood et al. |
| 2010/0127427 A1* | 5/2010 | Kia ............ B29C 61/08 425/503 |

FOREIGN PATENT DOCUMENTS

| | | |
|---|---|---|
| EP | 3456632 | 3/2019 |
| EP | 3466596 | 4/2019 |
| WO | 2017184173 | 10/2017 |
| WO | 2019156604 | 8/2019 |

OTHER PUBLICATIONS

European Patent Office; European Office Action dated May 25, 2022 in application No. 19216305.3.
European Patent Office, European Search Report dated Jul. 3, 2020 in Application No. 19216305.3.
Spintech, LLC, Smart Tooling Presentation; "Smart Tooling Options for Resin Transfer Molding (RTM) Composite Fabrication," Nov. 20, 2017.
YouTube; Smart Caul Trapped Geometry Demold Process; published Nov. 19, 2017; accessed Feb. 20, 2020; YOUIhttps://www.youtube.com/watch?v=Q2LU630X2mQ.

* cited by examiner

SHAPE MEMORY MANUFACTURING FOR VESSELS

CROSS-REFERENCE TO RELATED APPLICATIONS

This application is a nonprovisional of, and claims priority to, and the benefit of U.S. Provisional Application No. 62/888,211 entitled "SHAPE MEMORY MANUFACTURING FOR VESSELS" and filed on Aug. 16, 2019, which is hereby incorporated by reference in its entirety.

FIELD

The present disclosure relates to high-pressure fluid vessels. More specifically, the present disclosure relates to high-pressure fluid vessels for use in aircraft potable water systems.

BACKGROUND

Conformal aircraft potable water systems supply drinkable water throughout an aircraft for various uses. Aircraft potable water systems typically include many parts, including but not limited to: fluid vessels, hydraulic pumps, fluid heaters, control valves, and hydraulic fluid line tubing. The fluid vessels used for aircraft potable water vessels are generally pressurized and must maintain their shape while under internal pressure. The preferred shape for high-pressure fluid vessels is a cylindrical or spherical shape because there are few corners, reducing the number of stress concentration locations.

High-pressure fluid vessels for aircraft potable water systems should fit into a limited space, shape, and size. In some application, the shape may significantly deviate from the cylindrical or spherical shape preferred by pressurized vessels. Further, as with any other aircraft components, the high-pressure fluid vessel should be lightweight to meet aircraft weight restrictions.

SUMMARY

A method of manufacturing a cured vessel, in accordance with various embodiments, is disclosed herein. The method may comprise: wrapping a first bladder with a first composite laminate, the first bladder being in a first rigid state; wrapping a second bladder with a second composite laminate, the second bladder being in a second rigid state; joining the first composite laminate to the second composite laminate; wrapping the first composite laminate and the second composite laminate in a third composite laminate and forming an un-cured vessel; curing the un-cured vessel in a vessel mold; removing the first bladder and the second bladder.

In various embodiments, the method may further comprise removing the cured vessel from the vessel mold. The method may further comprise, prior to wrapping the first bladder: disposing the first bladder and the second bladder in a bladder mold; heating the first bladder into a first elastic state and the second bladder into a second elastic state; pressurizing the first bladder and the second bladder; and cooling the first bladder into the first rigid state and the second bladder into the second rigid state. The curing the un-cured vessel in the vessel mold may further comprise heating and pressurizing the first bladder and the second bladder. The first bladder and the second bladder may be removed when they are in a first elastic state and a second elastic state. The first bladder may comprise an internal support adjacent surface and a protrusion extending away from the internal support adjacent surface when the first bladder is in the first rigid state. The internal support adjacent surface may abut an internal support of the first composite laminate. The protrusion may abut an adjacent protrusion of the second bladder during the curing of the un-cured vessel.

A method of manufacturing vessels, in accordance with various embodiments, is disclosed herein. The method may comprise: heating a plurality of bladders disposed within a plurality of compartments of an un-cured vessel, the un-cured vessel disposed in a vessel mold, each compartment being adjacent to an adjacent compartment in the plurality of compartments; pressuring the plurality of bladders, each bladder in the plurality of bladders being in an elastic state; removing each bladder in the plurality of bladders from an aperture of a respective compartment in the plurality of compartments; removing a first cured vessel from the vessel mold; cooling each bladder in the plurality of bladders until each bladder is in a rigid state; disposing each bladder in the plurality of bladders in a bladder mold; heating each bladder in the plurality of bladders until each bladder is in the elastic state; and pressuring each bladder in the plurality of bladders.

In various embodiments, the method may further comprise wrapping each bladder in the plurality of bladders in a composite laminate of a plurality of composite laminates. The method may further comprise joining each composite laminate with an adjacent composite laminate. The method may further comprise wrapping the plurality of composite laminates in an outer composite laminate. The method may further comprise disposing the outer composite laminate in the vessel mold. The method may further comprise: heating each bladder in the plurality of bladders until each bladder is in the elastic state; pressurizing each bladder in the plurality of bladders; and curing each composite laminate in the plurality of composite laminates to an adjacent composite laminate in the plurality of composite laminates. The method may further comprise: curing the outer composite laminate to the plurality of composite laminates. Each composite laminate in the plurality of composite laminates may define a compartment of a second un-cured vessel.

A cured vessel, in accordance with various embodiments, is disclosed herein. The cured vessel may comprise: a first compartment comprising a first domed end, a second domed end, a first semi-cylindrical portion extending between the first domed end and the second domed end, and a first cavity formed in the first compartment having a first internal volume, the first semi-cylindrical portion including a curved external wall, the first domed end having a first aperture; and a second compartment coupled to the first compartment, the second compartment comprising a third domed end, a fourth domed end, a second semi-cylindrical portion extending between the third domed end and the second domed end, and a second cavity formed in the second compartment having a second internal volume, the second internal volume being greater than the first internal volume, the third domed end having a second aperture.

In various embodiments, the first compartment and the second compartment are monolithic. The first compartment may comprise a first internal support. The second compartment may comprise a second internal support fused to the first internal support. The cured vessel may further comprise a noodle disposed between the first compartment and the second compartment, the noodle comprising a side concave surface extending from the first domed end of the first compartment to the third domed end of the second compartment, the first domed end and the third domed end being adjacent.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
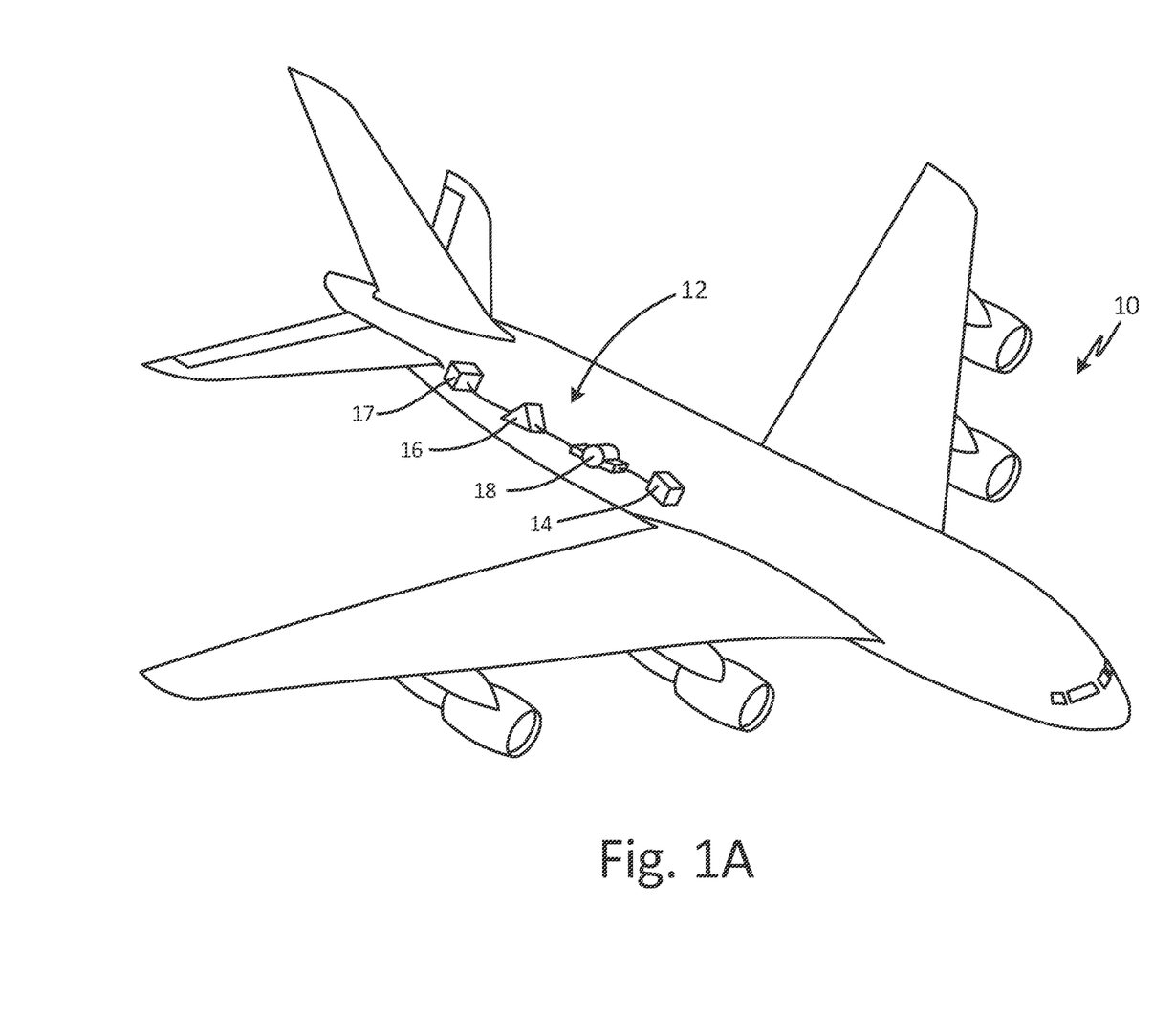
FIG. 1A illustrates a schematic of an aircraft with a potable water system, in accordance with various embodiments.
Figure 1B:
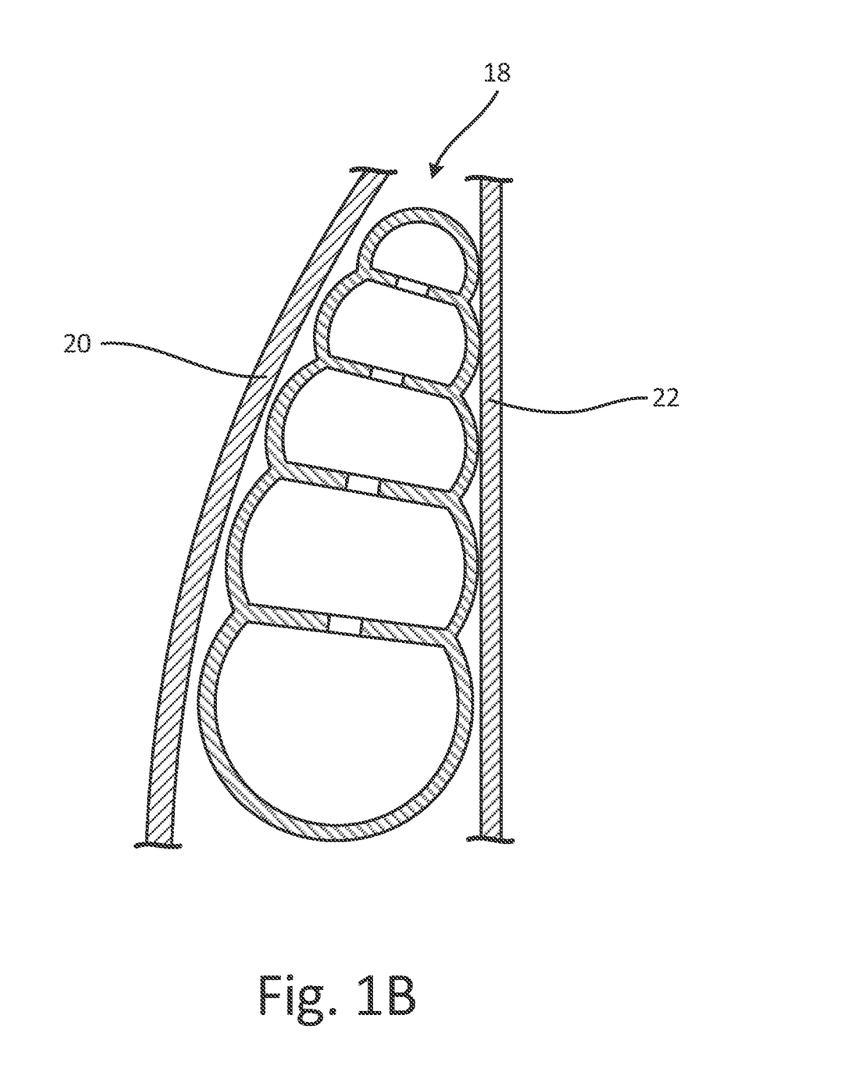
FIG. 1B illustrates a cross-sectional view of an aircraft fuselage, in accordance with various embodiments.

FIG. 1A is a schematic of aircraft 10 with potable water system 12, in accordance with various embodiments, which includes air compressor 14, control valve 16, point of use 17, and high-pressure fluid vessel 18. FIG. 1B is a cross-sectional view of aircraft 10, in accordance with various embodiments, showing high-pressure fluid vessel 18, external fuselage structure 20, and internal aircraft structure 22.

Potable water system 12 is situated in an aft portion of aircraft 10. Within potable water system 12, tubes, lines, or hoses connect air compressor 14, control valve 16, point of use 17, and high-pressure fluid vessel 18. Fluid flow within potable water system 12 is induced by air compressor 14, which pressurizes the vessel and drives water through the potable water system. Control of the fluid flow within potable water system 12 is achieved by utilizing control valve 16. Potable water, for use in potable water system 12, is stored at an elevated pressure (e.g., around 50 psig between the inside and outside of the vessel) within high-pressure fluid vessel 18.

As shown in FIG. 1B, high-pressure fluid vessel 18 is configured to conform to both external fuselage structure 20 and internal aircraft structure 22. The portion of high-pressure fluid vessel 18 closest to external fuselage structure 20 is curved to conform to the curvature of external fuselage structure 20. Likewise, the portion of high-pressure fluid vessel 18 closest to internal aircraft structure 22 is more or less flat to conform to internal aircraft structure 22. FIG. 1B shows one embodiment of conformable high-pressure fluid vessel 18 and is not meant to limit the disclosure to a single embodiment. High-pressure fluid vessel 18 is conformable for use in a plurality of irregular aircraft spaces.

Figure 2A:
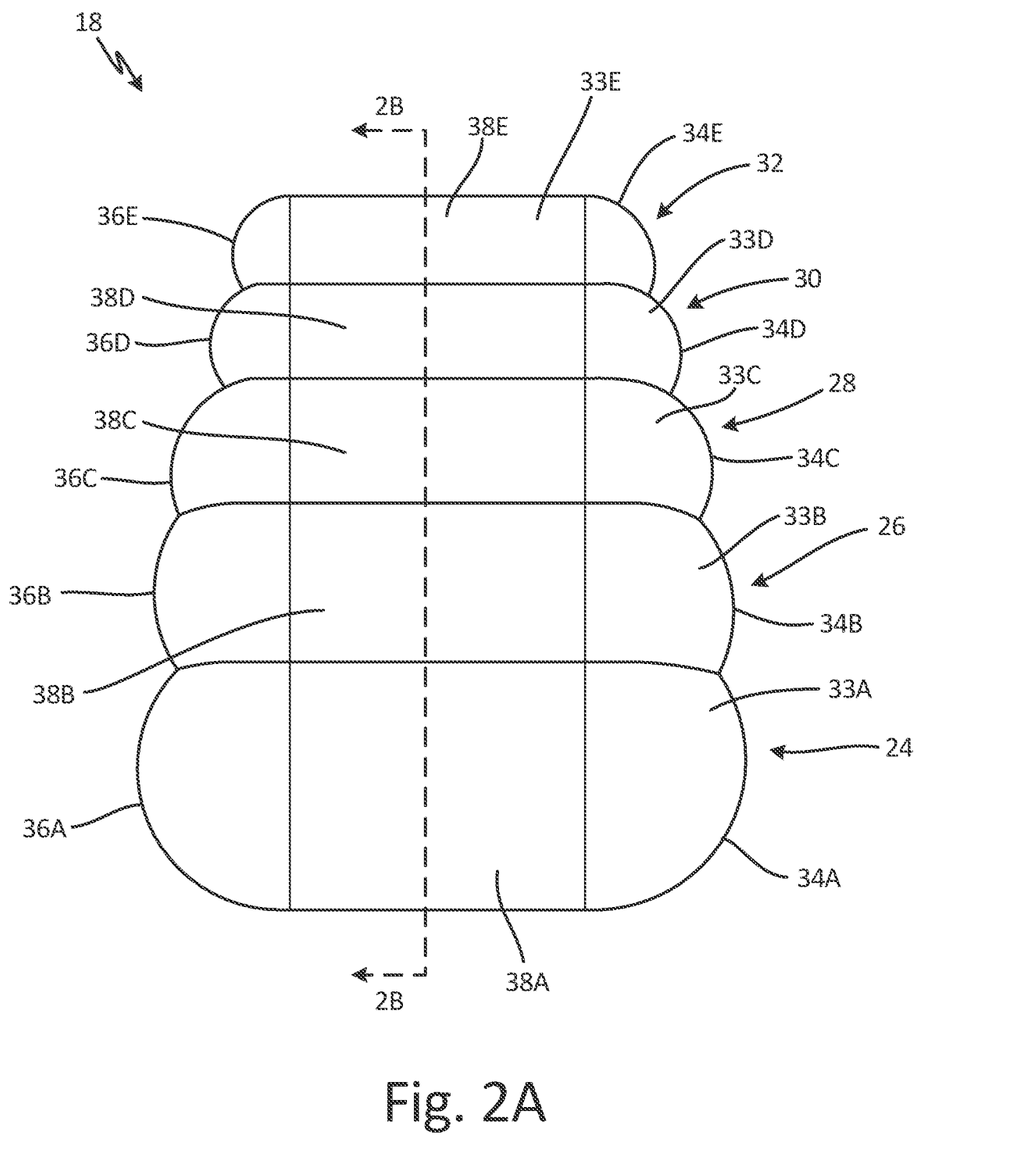
FIG. 2A illustrates a front view of a high-pressure fluid vessel, in accordance with various embodiments.
Figure 2B:
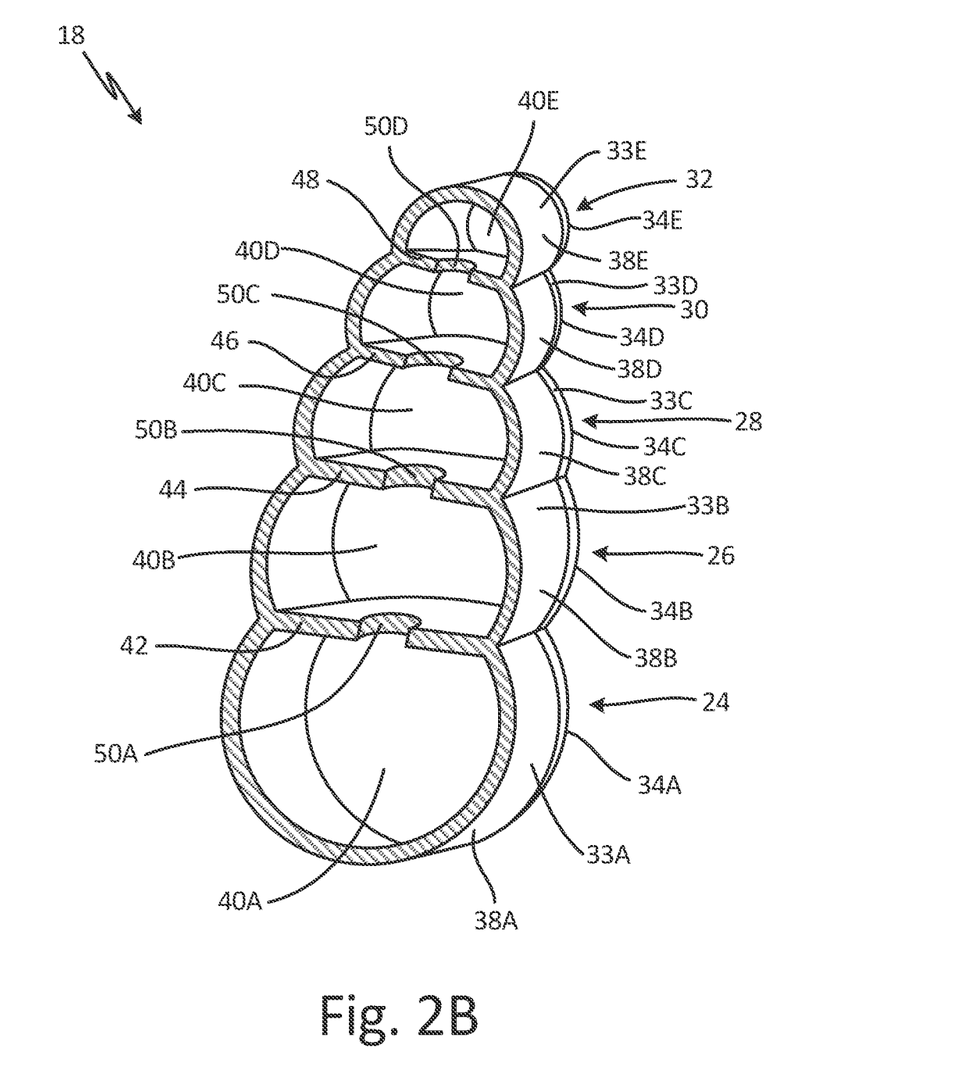
FIG. 2B illustrates a perspective cross-sectional view of the high-pressure fluid vessel taken along line 2B-2B of FIG. 2A, in accordance with various embodiments.

FIG. 2A is a front view of high-pressure fluid vessel 18, in accordance with various embodiments. FIG. 2B is a perspective cross-sectional view of high-pressure fluid vessel 18 taken along line 2B-2B of FIG. 2A, in accordance with various embodiments. With reference to both FIGS. 2A and 2B, high-pressure fluid vessel 18 includes proximal compartment 24, intermediate compartments 26, 28, and 30, and distal compartment 32. Proximal compartment 24 includes capsule 33A with first domed end 34A, second domed end 36A (shown in FIG. 2A), semi-cylindrical portion 38A, and cavity 40A (shown in FIG. 2B). Intermediate compartment 26 includes capsule 33B with first domed end 34B, second domed end 36B (shown in FIG. 2A), semi-cylindrical portion 38B, and cavity 40B (shown in FIG. 2B). Intermediate compartment 28 includes capsule 33C with first domed end 34C, second domed end 36C (shown in FIG. 2A), semi-cylindrical portion 38C, and cavity 40C (shown in FIG. 2B). Intermediate compartment 30 includes capsule 33D with first domed end 34D, second domed end 36D (shown in FIG. 2A), semi-cylindrical portion 38D, and cavity 40D (shown in FIG. 2B). Distal compartment 32 includes capsule 33E with first domed end 34E, second domed end 36E (shown in FIG. 2B), semi-cylindrical portion 38E, and cavity 40E (shown in FIG. 2B). High-pressure fluid vessel 18 further includes internal supports 42, 44, 46, and 48 (shown in FIG. 2B). Internal support 42 includes apertures 50A (shown in FIG. 2B). Internal support 44 includes aperture 50B (shown in FIG. 2B). Internal support 46 includes aperture 50C (shown in FIG. 2B). Internal support 48 includes aperture 50D (shown in FIG. 2B).

Located at a proximal end of high-pressure fluid vessel 18 is proximal compartment 24, which is located below and connected to intermediate compartment 26. Intermediate compartment 26 is located below and connected to intermediate compartment 28. Intermediate compartment 28 is located below and connected to intermediate compartment 30. Intermediate compartment 30 is located below and connected to distal compartment 32 at a distal end of high pressure fluid vessel 18. In various embodiments, high-pressure fluid vessel 18 has three intermediate compartments 26, 28, and 30. In various embodiments, high-pressure fluid vessel 18 can include any number of intermediate compartments or no intermediate compartments.

Capsules 33A, 33B, 33C, 33D, and 33E are convex, curved shaped body portions of proximal compartment 24, intermediate compartments 26, 28, and 30, and distal compartment 32, respectively. Capsule 33A of proximal compartment 24 includes first domed end 34A, second domed end 36A, and semi-cylindrical portion 38A extending between and connecting first domed end 34A and second domed end 36A. Cavity 40A is positioned in proximal compartment 24 and is defined by capsule 33A. Capsule 33B of intermediate compartment 26 comprises first domed end 34B, second domed end 36B, and semi-cylindrical portion 38B extending between and connecting first domed end 34B and second domed end 36B. Cavity 40B is positioned in intermediate compartment 26 and is defined by capsule 33B. Capsule 33C of intermediate compartment 28 includes first domed end 34C, second domed end 36C, and semi-cylindrical portion 38C extending between and connecting first domed end 34C and second domed end 36C. Cavity 40C is positioned in intermediate compartment 28 and is defined by capsule 33C. Capsule 33D of intermediate compartment 30 includes first domed end 34D, second domed end 36D, and semi-cylindrical portion 38D extending between and connecting first domed end 34D and second domed end 36D. Cavity 40D is positioned in intermediate compartment 30 and is defined by capsule 33D. Capsule 33E of distal compartment 32 includes first domed end 34E, second domed end 36E, and semi-cylindrical portion 38E extending between and connecting first domed end 34E and second domed end 36E. Cavity 40E is positioned in distal compartment 32 and is defined by capsule 33E.

First domed ends 34A, 34B, 34C, 34D, and 34E and second domed ends 36A, 36B, 36C, 36D, and 36E are semispherical shaped. Semicylindrical portions 38A, 38B, 38C, 38D, and 38E are right circular cylindrical shaped where a cross-section of the semicylindrical portions 38A, 38B, 38C, 38D, and 38E are circular shaped.

Internal supports 42, 44, 46, and 48 are positioned in high-pressure fluid vessel 18 to provide structural support for high-pressure fluid vessel 18. Internal supports 42, 44, 46, and 48 are baffles in the embodiment shown in FIGS. 2A-2B. Internal support 42 is positioned between proximal compartment 24 and intermediate compartment 26. Internal support 44 is positioned between intermediate compartment 26 and intermediate compartment 28. Internal support 46 is positioned between intermediate compartment 28 and intermediate compartment 30. Internal support 48 is positioned between intermediate compartment 30 and distal compartment 32.

Aperture 50A extends through internal support 42 to connect proximal compartment 24 to intermediate compartment 26. Aperture 50B extends through internal support 44 to connect intermediate compartment 26 to intermediate compartment 28. Aperture 50C extends through internal support 46 to connect intermediate compartment 28 to intermediate compartment 30. Aperture 50D extends through internal support 48 to connect intermediate compartment 30 to distal compartment 32. In various embodiments, internal supports 42, 44, 46, and 48 can include one or more apertures 50A, 50B, 50C, and 50D, each aperture being of equal or varying size.

High-pressure fluid vessel 18 is capable of holding potable water on aircraft 10. High-pressure fluid vessel 18 includes proximal compartment 24, intermediate compartments 26, 28, and 30, and distal compartment 32 that are designed to conform to aircraft 10. High-pressure fluid vessel 18 includes internal supports 42, 44, 46, and 48 to provide structural support to high-pressure fluid vessel 18 to prevent high-pressure fluid vessel 18 from deforming under pressure. Apertures 50A, 50B, 50C, and 50D extend through internal supports 42, 44, 46, and 48 respectively, to allow potable water to flow through high-pressure fluid vessel 18.

Figure 3:
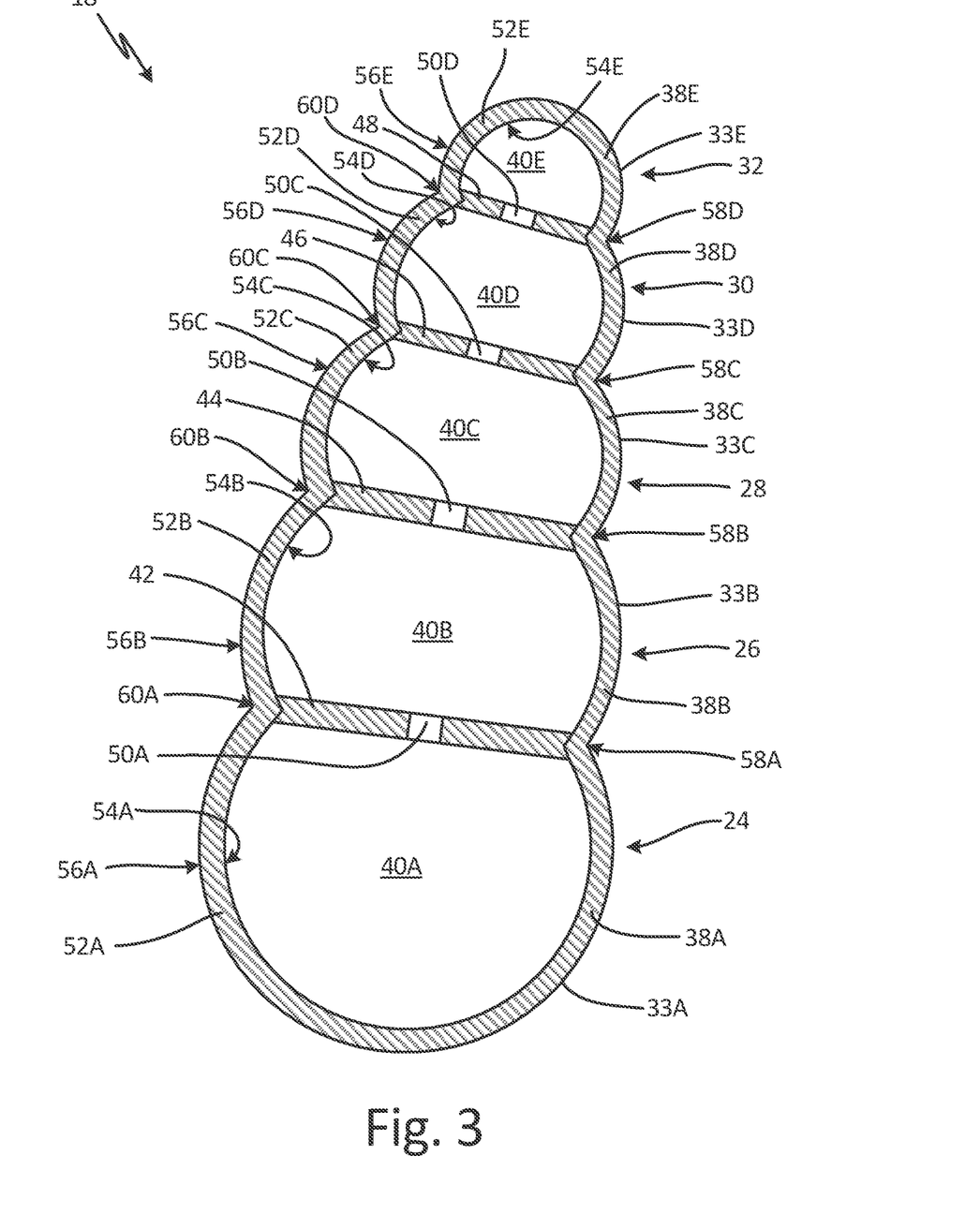
FIG. 3 illustrates a side cross-sectional view of the high-pressure fluid vessel of FIG. 2A, in accordance with various embodiments.

FIG. 3 is a side cross-sectional view of high-pressure fluid vessel 18. High-pressure fluid vessel 18 includes proximal compartment 24, intermediate compartments 26, 28, and 30, and distal compartment 32 with capsules 33A, 33B, 33C, 33D, and 33E having first domed ends 34A, 34B, 34C, 34D, and 34E (shown in FIGS. 2A-2B), second domed ends 36A, 36B, 36C, 36D, and 36E (shown in FIG. 2A), semi-cylindrical portions 38A, 38B, 38C, 38D, and 38E, and cavities 40A, 40B, 40C, 40D, and 40E, respectively. High-pressure fluid vessel 18 further includes internal supports 42, 44, 46, and 48, with apertures 50A, 50B, 50C, and 50D, respectively. Semi-cylindrical portions 38A, 38B, 38C, 38D, and 38E include curved external walls 52A, 52B, 52C, 52D, and 52E, concave inner surfaces 54A, 54B, 54C, 54D, and 54E, and convex outer surfaces 56A, 56B, 56C, 56D, and 56E, respectively. Also shown in FIG. 3 are first intersection locations 58A, 58B, 58C, and 58D and second intersection locations 60A, 60B, 60C, and 60D.

High-pressure fluid vessel 18 includes proximal compartment 24 at a base, intermediate compartments 26, 28, and 30, and distal compartment 32 at a distal end. Capsules 33A, 33B, 33C, 33D, and 33E are arcuate shaped body portions of proximal compartment 24, intermediate compartments 26, 28, and 30, and distal compartment 32, respectively. Proximal compartment 24 includes capsule 33A with first domed end 34A opposite of second domed end 36A and semi-cylindrical portion 38A extending there between. Cavity 40A is formed in proximal compartment 24. Intermediate compartment 26 includes capsule 33B with first domed end 34B opposite of second domed end 36B and semi-cylindrical portion 38C extending there between. Cavity 40B is formed in intermediate compartment 26. Intermediate compartment 28 includes capsule 33C with first domed end 34C opposite of second domed end 36C and semi-cylindrical portion 38C extending there between. Cavity 40C is formed in intermediate compartment 28. Intermediate compartment 30 includes capsule 33D with first domed end 34D opposite of second domed end 36D and semi-cylindrical portion 38D extending there between. Cavity 40D is formed in intermediate compartment 30. Distal compartment 32 includes capsule 33E with first domed end 34E opposite of second domed end 36E and semi-cylindrical portion 38E extending there between. Cavity 40E is formed in distal compartment 32.

High-pressure fluid vessel 18 further includes internal supports 42, 44, 46, and 48. Internal support 42 is positioned between proximal compartment 24 and intermediate compartment 26, and aperture 50A extends through internal support 42. Internal support 44 is positioned between intermediate compartment 26 and intermediate compartment 28, and aperture 50B extends through internal support 44. Internal support 46 is positioned between intermediate compartment 28 and intermediate compartment 30, and aperture 50C extends through internal support 46. Internal support 48 is positioned between intermediate compartment 30 and distal compartment 32, and aperture 50D extends through internal support 48.

High-pressure fluid vessel 18 will include a port to fill high-pressure fluid vessel 18. The port is preferably positioned in distal compartment 32, but can be positioned in any of proximal compartment 24, intermediate compartments 26, 28, 30, and distal compartment 32. A liquid such as water may be placed into and released from high-pressure fluid vessel 18 through the port. The liquid in high-pressure fluid vessel 18 may move between proximal compartment 24, intermediate compartments 26, 28, 30, and distal compartment 32 by flowing through apertures 50A, 50B, 50C, and 50D. Apertures 50A, 50B, 50C, and 50D can be any size and shape and there can be multiple apertures 50A, 50B, 50C, and 50D in internal supports 42, 44, 46, and 48 in various embodiments. High pressure fluid vessel 18 will also include a port to remove water from the vessel. The port is positioned at a proximal end of proximal compartment 24.

High-pressure fluid vessel 18 is designed to conform to a space on aircraft 10 (see FIG. 1B). Semi-cylindrical portions 38A, 38B, 38C, 38D, and 38E of proximal compartment 24, intermediate compartments 26, 28, and 30, and distal compartment 32, respectively, are curved to help high-pressure fluid vessel 18 conform to the space on aircraft 10 and to reduce stresses in semi-cylindrical portions 38A, 38B, 38C, 38D, and 38E.

Semi-cylindrical portion 38A of proximal compartment 24 includes curved external wall 52A. Curved external wall 52A includes concave inner surface 54A and convex outer surface 56A. Semi-cylindrical portion 38B of intermediate compartment 26 includes curved external wall 52B. Curved external wall 52B further includes concave inner surface 54B and convex outer surface 56B. Semi-cylindrical portion 38C of intermediate compartment 28 includes curved external wall 52C. Curved external wall 52C includes concave inner surface 54C and convex outer surface 56C. Semi-cylindrical portion 38D of intermediate compartment 30 includes curved external wall 52D. Curved external wall 52D further includes concave inner surface 54D and convex outer surface 56D. Semi-cylindrical portion 38E of distal compartment 32 includes curved external wall 52E. Curved external wall 52E includes concave inner surface 54E and convex outer surface 56E.

High-pressure fluid vessel 18 includes a flat side portion and a curved side portion. The flat side portion is the side in which a tangent line can be drawn from curved external wall 52A to curved external wall 52E and approximately only contact curved external walls 52B, 52C, and 52D at a single tangent point of each; the right side of high-pressure fluid vessel 18 as oriented in FIG. 3. The curved side portion is the side opposite the flat side portion; the left side of high-pressure fluid vessel 18 as oriented in FIG. 3.

Curved external walls 52A, 52B, 52C, 52D, and 52E abut one another at first intersection locations 58A, 58B, 58C, and 58D and second intersection locations 60A, 60B, 60C, and 60D, respectfully. Proximal compartment 24 is connected to intermediate compartment 26 at first intersection location 58A and second intersection location 60A. Intermediate compartment 26 is connected to intermediate compartment 28 at first intersection location 58B and second intersection location 60B. Intermediate compartment 28 is connected to intermediate compartment 30 at first intersection location 58C and second intersection location 60C. Intermediate compartment 30 is connected to distal compartment 32 at first intersection location 58D and second intersection location 60D.

Located on the flat side portion of high-pressure fluid vessel 18 are first intersection locations 58A, 58B, 58C, and 58D. The intersection of curved external wall 52A and curved external wall 52B defines first intersection location 58A. The intersection of curved external wall 52B and curved external wall 52C defines first intersection location 58B. The intersection of curved external wall 52C and curved external wall 52D defines first intersection location 58C. The intersection of curved external wall 52D and curved external wall 52E defines first intersection location 58D.

Located on the curved side portion of high-pressure fluid vessel 18 are second intersection locations 60A, 60B, 60C, and 60D. The intersection of curved external wall 52A and curved external wall 52B defines second intersection location 60A. The intersection of curved external wall 52B and curved external wall 52C defines second intersection location 60B. The intersection of curved external wall 52C and curved external wall 52D defines second intersection location 60C. The intersection of curved external wall 52D and curved external wall 52E defines second intersection location 60D.

According to the present disclosure, high-pressure fluid vessel 18 must include at least two compartments connected at a first intersection location and a second intersection location. High-pressure fluid vessel 18, in its smallest form, includes proximal compartment 24 and distal compartment 32 connected at a first intersection location and a second intersection location. With that said, high-pressure fluid vessel 18 is not limited to a maximum number of compartments and intersection locations; high-pressure fluid vessel 18 can include as many compartments and intersection locations as desired to conform to an irregular shape or space. The high-pressure fluid vessel described in the preceding paragraphs is a representation of a single embodiment and not meant to limit the disclosure to this particular embodiment.

As shown in FIG. 1B and discussed above, high-pressure fluid vessel 18 curves to conform to external fuselage structure 20. The curvature described is achieved by proximal compartment 24, intermediate compartments 26, 28, and 30, and distal compartment 32 having different volumes and radii of curvature. Proximal compartment 24 has the largest volume and radius of curvature, intermediate compartment 26 has a volume and radius of curvature that is smaller than proximal compartment 24, intermediate compartment 28 has a volume and radius of curvature that is smaller than intermediate compartment 26, intermediate compartment 30 has a volume and radius of curvature that is smaller than intermediate compartment 28, and distal compartment 32 has the smallest volume and radius of curvature. The radii of curvature of first domed ends 34A, 34B, 34C, 34D, and 34E, second domed ends 36A, 36B, 36C, 36D, and 36E, and semi-cylindrical portions 38A, 38B, 38C, 38D, and 38E, respectively, are preferably the same for each of capsule 33A, 33B, 33C, 33D, and 33E. The curvature of high-pressure fluid vessel 18 is achieved by curved external walls 52A, 52B, 52C, 52D, and 52E having different volumes and radii while maintaining the flat side portion of high-pressure fluid vessel 18. With the flat side portion being held constant and the compartments volume and radii being different, the curved side portion is formed. The curvature of the curved side portion can be varied by modifying the volume and radii of each compartment. In the embodiment shown, high-pressure fluid vessel 18 includes five compartments, each of different volumes and radii. In all embodiments of high-pressure fluid vessel 18, at least two of the compartments must be of different volumes and radii.

High-pressure fluid vessel 18 further includes internal supports 42, 44, 46, and 48 to prevent proximal compartment 24, intermediate compartments 26, 28, 30, and distal compartment 32 from deforming under internal pressure. Internal supports 42, 44, 46, and 48 include apertures 50A, 50B, 50C, and 50D, respectively.

Internal support 42 extends from first intersection location 58A to second intersection location 60A. Internal support 44 extends from first intersection location 58B to second intersection location 60B. Internal support 46 extends from first intersection location 58C to second intersection location 60C. Internal support 48 extends from first intersection location 58D to second intersection location 60D.

High-pressure fluid vessel 18 would deform under internal pressure without internal supports 42, 44, 46, and 48. Internal supports 42, 44, 46, and 48 provide structural support to curved external walls 52A, 52B, 52C, 52D, and 52E. Further, internal supports 42, 44, 46, and 48, are strategically placed to evenly distribute the stresses in curved external walls 52A, 52B, 52C, 52D, and 52E. This results in a high-pressure vessel that is high strength and structurally efficient.

Figure 4:
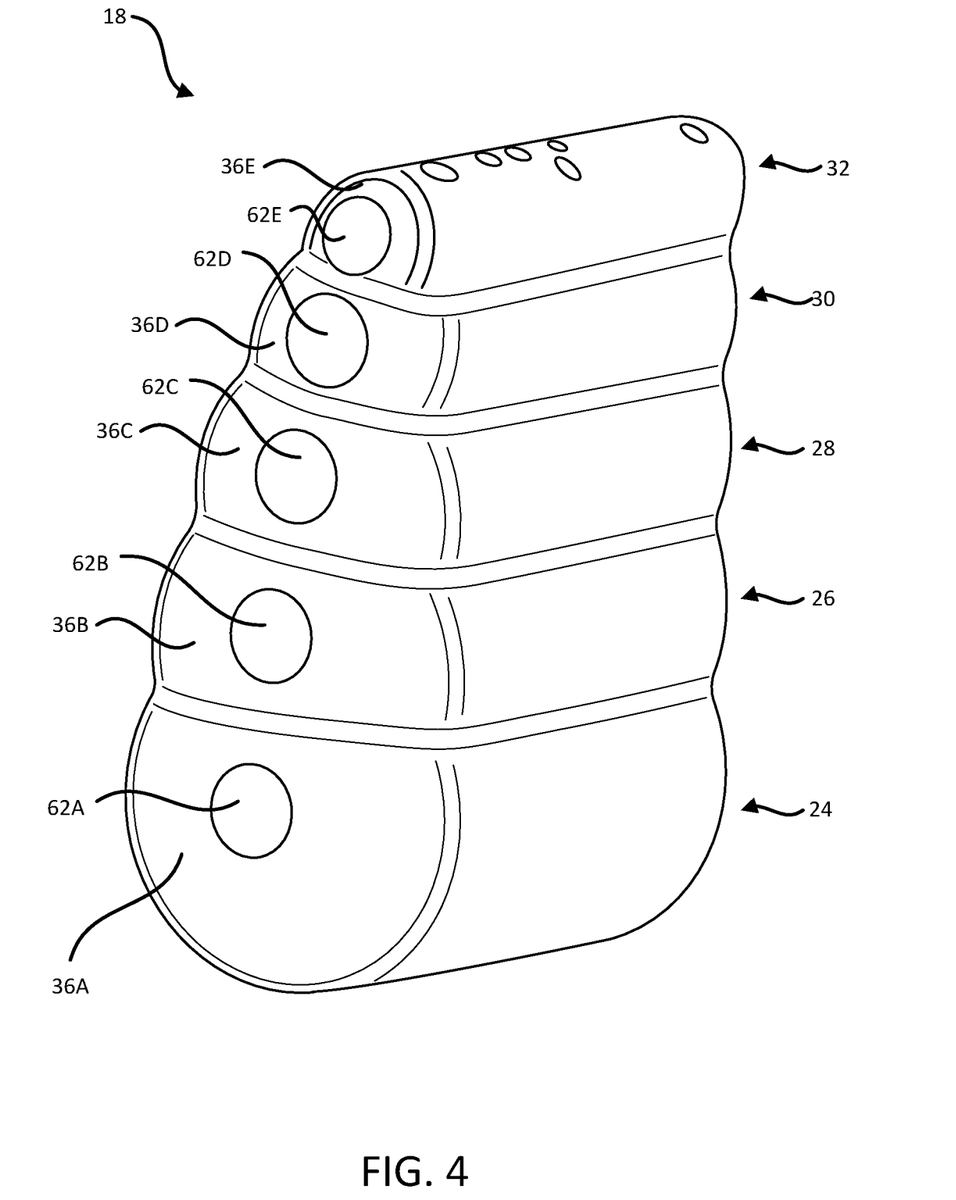
FIG. 4 illustrates a perspective view of the high-pressure fluid vessel, in accordance with various embodiments.

With reference to FIG. 4, a perspective view of a high-pressure vessel assembly 18 manufactured utilizing smart tooling manufacturing, is illustrated, in accordance with various embodiments. The high-pressure vessel assembly 18 further comprises patches 62A, 62B, 62C, and 62E. Each patch seals an aperture disposed at the first domed end of the respective compartment. Each compartment comprises an aperture disposed at a domed end to allow removal of a smart tool, in accordance with various embodiments. Each patch may be disposed at a first domed end or a second domed end of a respective compartment. For example, a patch 62A may be disposed at the first domed end 36A of the proximal compartment 24, a patch 62B may be disposed at the first domed end 36B of intermediate compartment 26, a patch 62C may be disposed at the first domed end 36C of intermediate compartment 28, a patch 62D may be disposed at the first domed end 36D of intermediate compartment 30, and a patch 62E may be disposed at the first domed end 36E of distal compartment 32.

Figure 5:
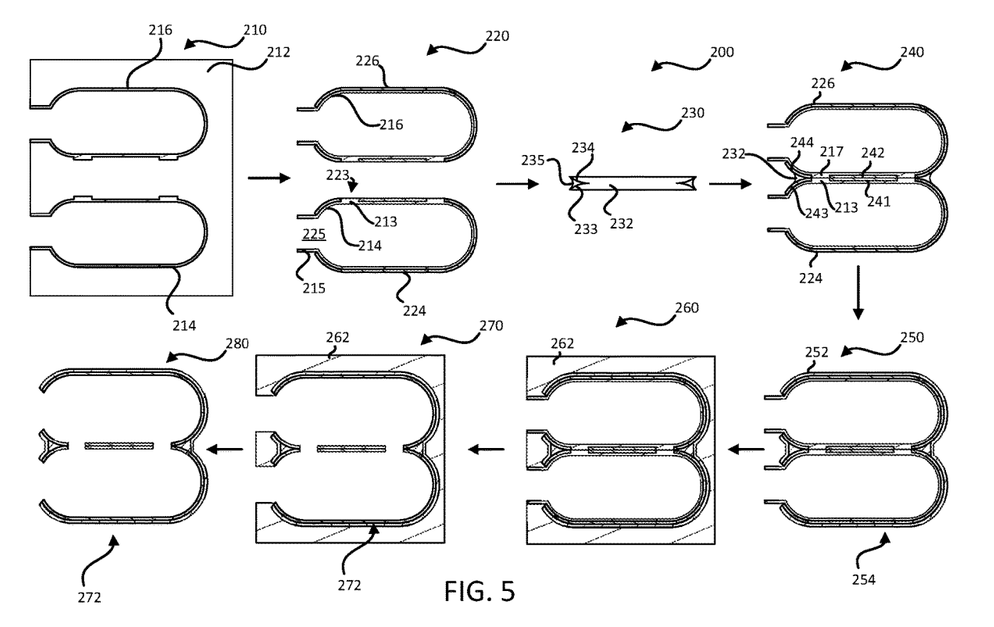
FIG. 5 illustrates a method for manufacturing a vessel, in accordance with various embodiments.

Referring now to FIG. 5, a method 200 for manufacturing a vessel, in accordance with various embodiments, is depicted. For the sake of brevity, the method 200 of manufacturing a vessel is represented as a two compartment vessel; although any number of compartments are within the scope of this disclosure. The method 200 comprises forming bladder(s) in a bladder mold (step 210). A bladder mold 212 may have a complimentary shape to a respective compartment of a vessel. A vessel may comprise any number of compartments. The bladder mold 212 may be aluminum, epoxy carbon composite, stainless steel, or any other material known in the art. In various embodiments, the bladder mold 212 is additively manufactured. A bladder mold 212 may comprise any number of receptacles for various bladder shapes to be formed simultaneously. In various embodiments, bladder mold 212 may comprise a receptacle for each bladder corresponding to a respective compartment in the of a high-pressure vessel assembly 18.

In various embodiments, bladder mold 212 may comprise a receptacle for bladders of adjacent compartments of a high-pressure vessel assembly 18. For example, bladder mold 212 is a bladder mold for a two compartment vessel (e.g., a proximal compartment and a distal compartment). A proximal bladder 214 and a distal bladder 216 may be disposed in a bladder mold 212. In various embodiments, bladders 214, 216 are in a rigid state when they are cold (e.g., between 50° F. (10° C.) and 100° F. (38° C.)) and are in an elastic state when bladders 214, 216 are hot (e.g., between 160° F. (71° C.) and 400° F. (205° C.)). A bladder may comprise any shape memory polymer known in the art. Bladders 214, 216 may be place in bladder mold 212 around room temperature, heated between 200° F. (95° C.) and 250° F. (120° C.), then pressurized to the desired compartment shape, and then cooled to create solid bladders in a complementary shape to a respective compartment of a vessel.

The method 200 further comprises wrapping the bladders 214, 216, now in a rigid state, with respective composite laminates 224, 226 (step 220). In various embodiments, the composite laminates 224, 226 are uncured carbon fiber, or any other material known in the art. The composite laminates may be wrapped in a compartment shape as described with respect to FIGS. 2-4 above. During step 220, the bladders 214, 216 may have an end extending external to the respective wrapped composite laminates 224, 226. Additionally, the bladders 214, 216 may each comprise a protrusion corresponding to a respective fluid port of a compartment. For example, a wrapped proximal composite laminate 224 comprises an aperture 225 disposed at a first end of wrapped proximal composite laminate 224 and proximal bladder 214 has a port 215 extending out the aperture 225 of the wrapped proximal composite laminate 224. Additionally, the wrapped proximal composite laminate 224 may comprise at least one fluid port 223 at respective protrusion 213 of proximal bladder 214.

The method 200 further comprises forming a noodle 232 (step 230). In various embodiments, a noodle 232 is an uncured carbon fiber similar to composite laminates 224, 226. Noodle 232 may be complimentary in shape to an intersection of the proximal composite laminate 224 and the distal composite laminate 226. For example, noodle 232 may comprise a proximal concave surface 233 configured to mate with a portion of wrapped proximal composite laminate 224. Similarly, noodle 232 may comprise a distal concave surface 234 configured to mate with a portion of wrapped distal composite laminate 226. Noodle 232 may further comprise a side concave surface 235 disposed between proximal concave surface 233 and distal concave surface 234 and forming a perimeter of noodle 232.

The method 200 further comprises joining the wrapped proximal composite laminate 224 to the wrapped distal composite laminate 226 and noodle 232 (step 240). During step 240, a proximal internal support 241 of wrapped proximal composite laminate 224 abuts a distal internal support 242 of wrapped distal composite laminate 226. Additionally, a portion of proximal domed end 243 abuts proximal concave surface 233 of noodle 232 and a portion of distal domed end 244 abuts distal concave surface 234 of noodle 232. A protrusion 213 of proximal domed end 243 may abut a protrusion 217 of distal bladder 216.

The method 200 further comprises wrapping the joined composite laminates and noodle with a second layer of composite laminate 252 (step 250). The composite laminate 252 may cover the entire outer surface of the joined composite laminates and noodle from step 240. Similar to composite laminates 224, 226 and the noodle 232, the composite laminate 252 may be made of un-cured carbon fibers, or any other laminate known in the art. The result of step 250 is an un-cured vessel 254, in accordance with various embodiments.

The method 200 further comprises curing the un-cured vessel in a vessel mold 262 (step 260). In various embodiments, the vessel mold 262 comprises two pieces that are mirror images of each other. Similar to the bladder mold 212, the vessel mold 262 may be aluminum, epoxy carbon composite, stainless steel, or any other material known in the art. The vessel mold 262 comprises a complimentary shape to the cured vessel. During step 260, the un-cured vessel 254 and the bladders 214, 216 are heated to a cure temperature of up to 365° F. (185° C.) and the inside of bladders 214, 216 are pressurized compressing the un-cured vessel 254 into a unitary, or monolithic, component.

The method 200 further comprises removing the bladders 214, 216 after the un-cured vessel 254 is cured (step 270). The bladders 214, 216 are in a hot state after cure, and may be elastic, which may allow removal of bladders 214, 216 by pulling on a respective port of bladders 214, 216. For example, a removal tool may be coupled to port 215 of bladder 214 and pull the bladder 214 out of the compartment of the cured vessel 272.

The method 200 further comprises removing the cured vessel 272 from the vessel mold 262 (step 280). After step 280, the bladder may be placed back in the bladder mold while still in a hot state, reformed to the bladder mold, and the method may be repeated to create another vessel.

Figure 6:
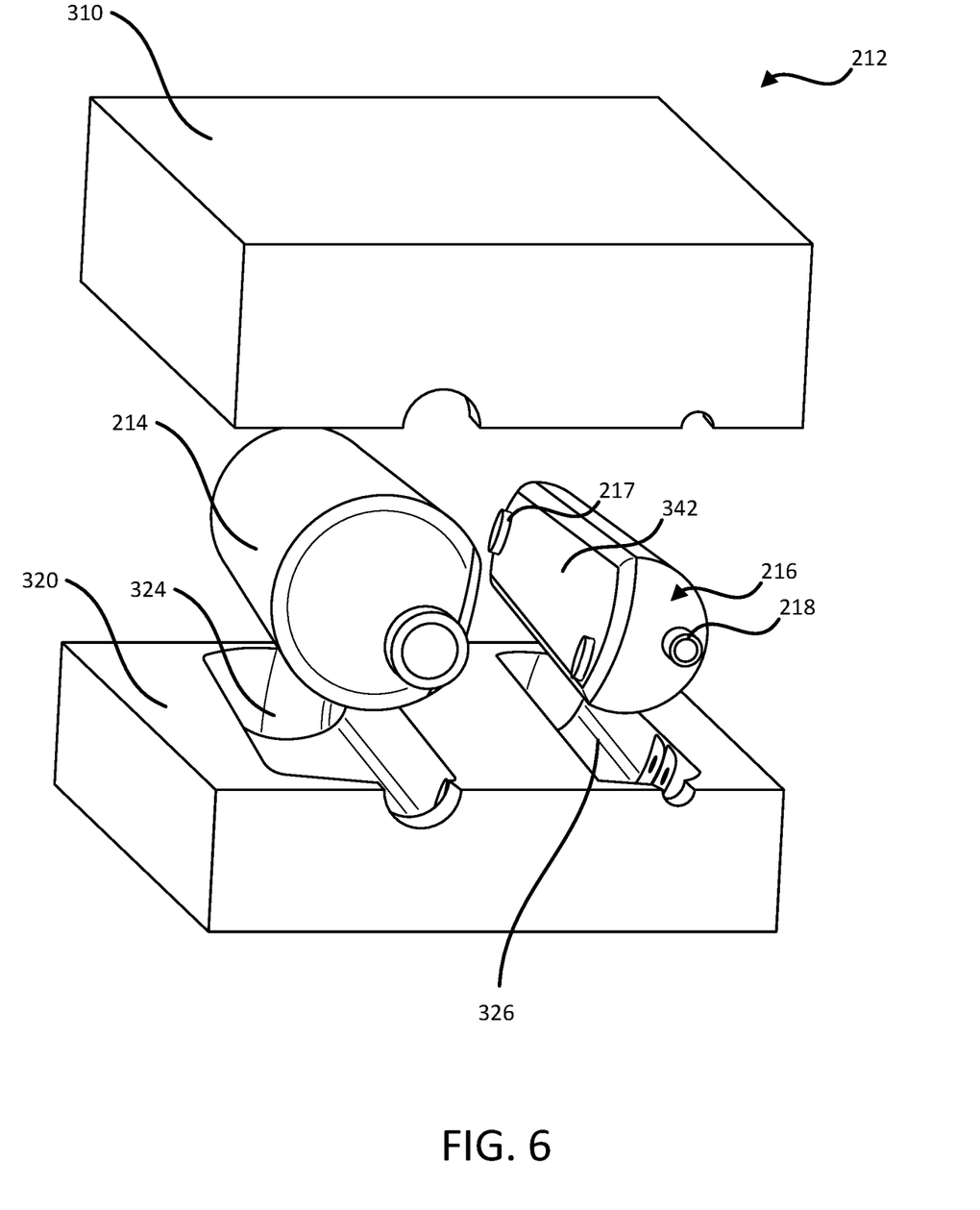
FIG. 6 illustrates a bladder being removed from a bladder mold, in accordance with various embodiments.

With reference to FIG. 5, proximal domed end 243 and distal bladder 216 being removed from a bladder mold 212 from step 210 after step 210 of method 200, in accordance with various embodiments, is illustrated. In various embodiments, bladder mold 212 comprises a distal shell 310 and a proximal shell 320. Each shell may comprise a recess being complimentary in shape to a portion of an exterior surface of a respective bladder. For example, proximal shell 320 may comprise a proximal bladder recess 324 and/or a distal bladder recess 326. The proximal bladder recess 324 may correspond to a first portion of the exterior surface of the proximal domed end 243. The distal shell 310 may comprise a complimentary proximal recess for proximal domed end 243, which may correspond to a second portion of the exterior surface of the proximal domed end 243. The proximal bladder recess 324 of the proximal shell 320 and the complimentary proximal recess of distal shell 310 may correspond to the entire exterior surface of the proximal domed end 243.

In various embodiments, each bladder comprises a port, an internal support adjacent surface, and a protrusion. For example, distal bladder 216 comprises a port 218 disposed at a first end of distal bladder 216. The port 218 is in fluid communication with the inside of distal bladder 216. The port 218 may be configured to allow an internal pressure to be applied on the internal surfaces of the distal bladder 216.

The distal bladder 216 further comprises an internal support adjacent surface 342. Internal support adjacent surface 342 may be flat, or any other shape known in the art. Internal support adjacent surface 342 may be configured to apply pressure an internal support surface of a respective composite laminate in step 240 of method 200. For example, with brief reference to FIG. 4, internal support adjacent surface 342 abuts distal internal support 242 and/or applies a force against distal internal support 242 during the curing step 260. A similar force is applied against proximal internal support 241 by an internal support adjacent surface of the proximal domed end 243 resulting in a compressive force between proximal internal support 241 and distal internal support 242. The compressive force may cure the proximal internal support 241 and the distal internal support 242 into a unitary, or monolithic, internal support surface.

The distal bladder 216 further comprises at least one protrusion 217 extending away from internal support adjacent surface 342. During step 220, where the bladders are in a rigid state, the composite laminate may be wrapped on the internal support adjacent surface 342 up to, or below, a height of the protrusion 217 from the internal support adjacent surface 342. During the curing step (step 270), the protrusion 217 of distal bladder abuts a respective protrusion of proximal domed end 243. Upon removal of the bladders 214, 216, the cured vessel may have a fluid connection where the protrusion 217 of distal bladder and the respective protrusion of proximal domed end 243 abutted in the curing step (step 270) (see step 280 from FIG. 5).

Figure 7:
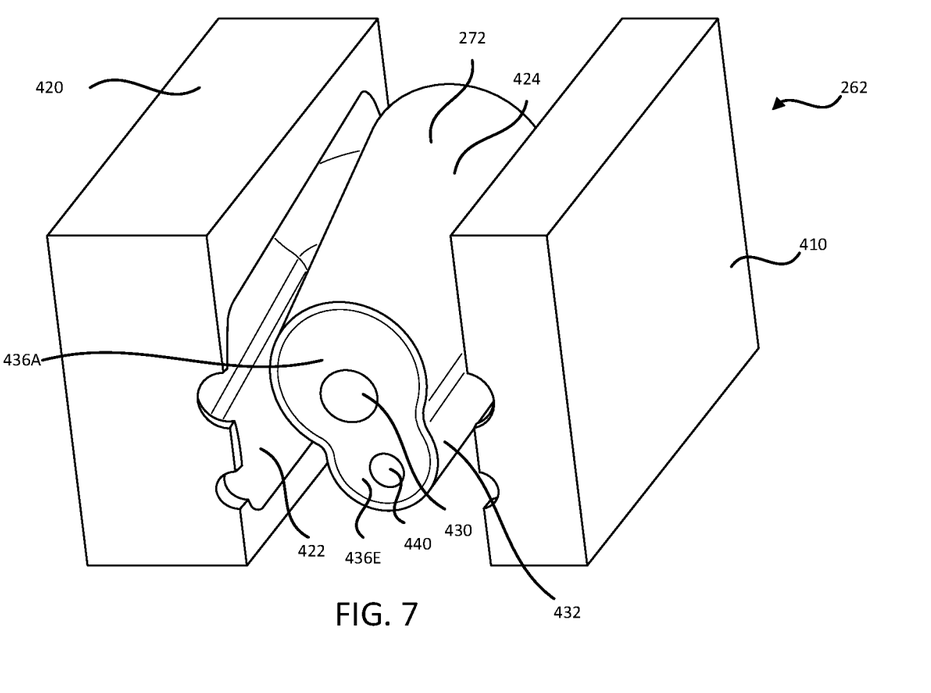
FIG. 7 illustrates a cured vessel being removed from a vessel mold, in accordance with various embodiments.

Referring now to FIG. 7, a cured vessel 272 being removed from a vessel mold 262 after bladders 214, 216 have been removed, in accordance with various embodiments, is depicted. In various embodiments, vessel mold 262 comprises a first shell 410 and a second shell 420. Similar to the bladder mold 212, the vessel mold 262 may have a complimentary shape to a respective cured vessel 272. A cured vessel may comprise any number of compartments. The vessel mold 262 may be aluminum, epoxy carbon composite, stainless steel, or any other material known in the art. In various embodiments, the vessel mold 262 is additively manufactured. The vessel mold 262 may comprise a receptacle for a cured vessel with any number of compartments. In various embodiments, vessel mold 262 may comprise a receptacle for a five compartment vessel, as shown in FIGS. 2-4.

In various embodiments, vessel mold 262 comprises a first shell 410 and a second shell 420. Each shell may comprise a recess being complimentary in shape to a portion of an exterior surface of a cured vessel 272. For example, second shell 420 may comprise a second recess 422. The second recess 422 may correspond to a second portion of the exterior surface of the cured vessel 272. The first shell 410 may comprise a complimentary recess, e.g., a first recess, which may correspond to a first portion of the exterior surface of the cured vessel 272. The second recess 422 of the second shell 420 and the complimentary recess, first recess, of first shell 410 may correspond to the entire exterior surface of the cured vessel 272.

In various embodiments, cured vessel 272 comprises a proximal compartment 424 and a distal compartment 432. Proximal compartment 424 may comprise a domed end 436A and distal compartment 432 may comprise a domed end 436E. A proximal end aperture 430 is disposed at domed end 436E. Similarly, a distal end aperture is disposed at domed end 436E. Each aperture is provided to allow removal of bladders 214, 216. Each aperture may be sealed by a patch as described above with respect to FIG. 4. Cured vessel 272 may comprise a unitary, or monolithic, component.

Figure 8:
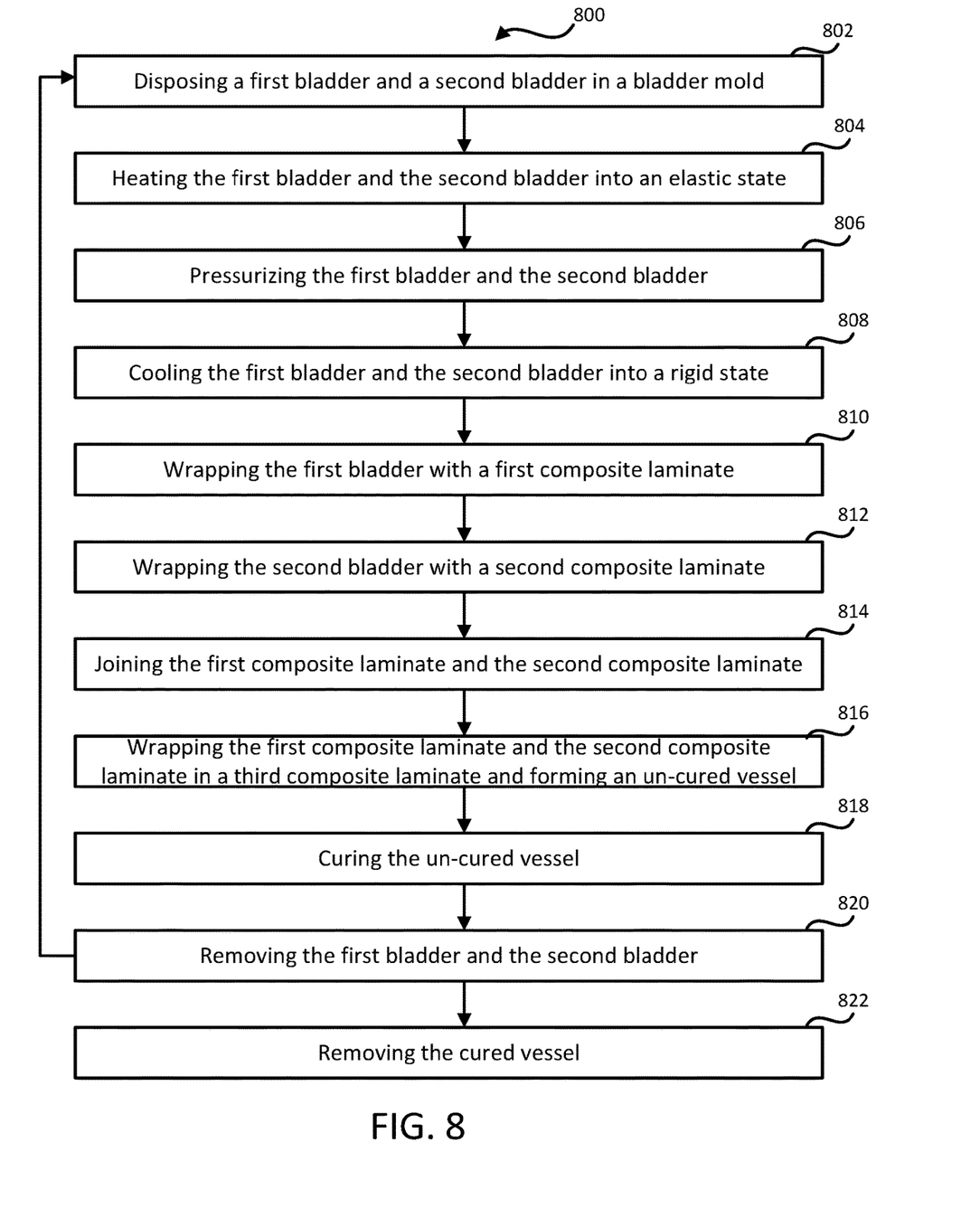
FIG. 8 illustrates a method of manufacturing a cured vessel, in accordance with various embodiments.

Referring now to FIG. 8, a method of manufacturing a cured vessel, in accordance with various embodiments, is depicted. The method comprises disposing a first bladder and/or a second bladder in a bladder mold (step 802). The bladder mold may be in accordance with FIGS. 5 and 6 as described above. The first bladder and the second bladder may be in a rigid state or elastic state prior to being placed in the mold. A bladder may be in a rigid state when it is under 160° F. (71° C.) and a bladder may be in an elastic state when it is between 160° F. (71° C.) and 400° F. (204° C.) depending on a smart resin utilized.

The method further comprises heating the first bladder and the second bladder into an elastic state, if the first bladder and second bladder are not already in an elastic state (step 804). Then, the first bladder and the second bladder are pressurized internally to take the shape of the bladder mold (step 806). In various embodiments, the first bladder and the second bladder may be pressurized between 30 psi and 150 psi (2-10 bar).

The method further comprises cooling the first bladder and the second bladder into a rigid state (step 808). The first bladder and second bladder may take a rigid state upon dropping in temperature below 160° F. (71° C.). In various embodiments, the first bladder and the second bladder may cool to room temperature or the like. Once in a cooled state, the first bladder is wrapped with a first composite laminate (step 810). The first composite laminate may be uncured carbon fiber, or any other material known in the art. Next, the second bladder is wrapped with a second composite laminate (step 812). The second composite laminate may be the same material as the first composite laminate or a different material. In various embodiments, the second composite laminate is the same material as the first composite laminate.

The method further comprises joining the first composite laminate and the second composite laminate (step 814). In various embodiments, this may be done by forming a noodle to dispose between the first composite laminate and the second composite laminate. In various embodiments, the noodle may couple an outer surface of the first composite laminate to an outer surface of the second composite laminate. A first internal support of the first composite laminate may contact a second internal support of the second composite laminate.

The method further comprises wrapping the first composite laminate and the second composite laminate in a third composite laminate and forming an uncured vessel (step (816). The third composite laminate may be wrapped around the majority of the exterior of the first composite laminate and the second composite laminate. In various embodiments, the third composite laminate is wrapped around the entire exterior of the first composite laminate, the second composite laminate, and/or the noodle. The third composite laminate may be the same material as the first composite laminate and/or the second composite laminate or a different material. In various embodiments, the second composite laminate is the same material as the first composite laminate and the second composite laminate.

The method further comprises curing the un-cured vessel (step 818). In various embodiments, the un-cured vessel may be cured at a temperature between 200° F. (93° C.) and 350° F. (177° C.). In various embodiments, the un-cured vessel may be cured at a pressure between 30 psi (2 bar) and 150 psi (10 bar). In various embodiments, curing the un-cured vessel may fuse the first composite laminate and the second composite laminate to the third composite laminate. In various embodiments, curing the un-cured vessel may fuse the first internal support to the second internal support. In various embodiments, curing the un-cured vessel may fuse the noodle to the first composite laminate, the second composite laminate, and the third composite laminate.

The method further comprises removing the first bladder and the second bladder (step 820). After curing, the first bladder and the second bladder may still be in a hot state (between 160° F. (71° C.) and 400° F. (205° C.)). As such, the first bladder and second bladder may be disposed back in the bladder mold from step 802 and the process repeated for a new vessel. The method may further comprise removing, or de-molding, the cured vessel (step 822).

In various embodiments, method 800 allows for removal of the bladders with relative ease and/or allows for manufacturing of conformal vessels with complex geometries that may maintain tight tolerances.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a cured vessel, the method comprising:
    wrapping a first bladder with a first composite laminate, the first bladder being in a first rigid state, the first bladder comprises an internal support adjacent surface and a protrusion extending away from the internal support adjacent surface when the first bladder is in the first rigid state;
    wrapping a second bladder with a second composite laminate, the second bladder being in a second rigid state;
    joining the first composite laminate to the second composite laminate;
    wrapping the first composite laminate and the second composite laminate in a third composite laminate and forming an un-cured vessel;
    curing the un-cured vessel in a vessel mold; and
    removing the first bladder and the second bladder.

2. The method of claim 1, further comprising removing the cured vessel from the vessel mold.

3. The method of claim 1, further comprising, prior to wrapping the first bladder:
disposing the first bladder and the second bladder in a bladder mold;
heating the first bladder into a first elastic state and the second bladder into a second elastic state;
pressurizing the first bladder and the second bladder; and
cooling the first bladder into the first rigid state and the second bladder into the second rigid state.

4. The method of claim 1, wherein curing the un-cured vessel in the vessel mold further comprises heating and pressurizing the first bladder and the second bladder.

5. The method of claim 1, wherein the first bladder and the second bladder are removed when they are in a first elastic state and a second elastic state.

6. The method of claim 1, wherein the internal support adjacent surface abuts an internal support of the first composite laminate.

7. The method of claim 1, wherein the protrusion abuts an adjacent protrusion of the second bladder during the curing of the un-cured vessel.

8. A method of manufacturing vessels, the method comprising:
heating a plurality of bladders, each bladder in the plurality of bladders comprising an internal support adjacent surface and a protrusion extending away from the internal support adjacent surface when each bladder is in a rigid state, the plurality of bladders disposed within a plurality of compartments of an un-cured vessel, the un-cured vessel disposed in a vessel mold, each compartment being adjacent to an adjacent compartment in the plurality of compartments;
pressuring the plurality of bladders, each bladder in the plurality of bladders being in an elastic state;
removing each bladder in the plurality of bladders from an aperture of a respective compartment in the plurality of compartments;
removing a first cured vessel from the vessel mold;
disposing each bladder in the plurality of bladders in a bladder mold;
heating each bladder in the plurality of bladders until each bladder is in the elastic state;
pressuring each bladder in the plurality of bladders; and
cooling each bladder in the plurality of bladders until each bladder is in the rigid state.

9. The method of claim 8, further comprising: wrapping each bladder in the plurality of bladders in a composite laminate of a plurality of composite laminates.

10. The method of claim 9, further comprising joining each composite laminate with an adjacent composite laminate.

11. The method of claim 10, further comprising wrapping the plurality of composite laminates in an outer composite laminate.

12. The method of claim 11, further comprising disposing the outer composite laminate in the vessel mold.

13. The method of claim 12, further comprising:
heating each bladder in the plurality of bladders until each bladder is in the elastic state;
pressurizing each bladder in the plurality of bladders; and
curing each composite laminate in the plurality of composite laminates to an adjacent composite laminate in the plurality of composite laminates.

14. The method of claim 13, further comprising: curing the outer composite laminate to the plurality of composite laminates.

15. The method of claim 9, wherein each composite laminate in the plurality of composite laminates defines a compartment of a second un-cured vessel.

* * * * *